US010997739B2

(12) United States Patent
Zuta et al.

(10) Patent No.: US 10,997,739 B2
(45) Date of Patent: May 4, 2021

(54) SYSTEMS AND METHODS FOR ACQUIRING INFORMATION FROM AN ENVIRONMENT

(71) Applicant: Guardian Optical Technologies Ltd., Tel-Aviv (IL)

(72) Inventors: Yoav Zuta, Tel-Aviv (IL); Gideon Carmon, Haifa (IL); Roi Levy, Rehovot (IL)

(73) Assignee: Guardian Optical, Tel Aviv (IL)

( * ) Notice: Subject to any disclaimer, the term of this patent is extended or adjusted under 35 U.S.C. 154(b) by 0 days.

(21) Appl. No.: 16/614,390

(22) PCT Filed: Jul. 12, 2018

(86) PCT No.: PCT/IL2018/050762
§ 371 (c)(1),
(2) Date: Nov. 18, 2019

(87) PCT Pub. No.: WO2019/012535
PCT Pub. Date: Jan. 17, 2019

(65) Prior Publication Data
US 2020/0184663 A1    Jun. 11, 2020

Related U.S. Application Data

(60) Provisional application No. 62/531,417, filed on Jul. 12, 2017.

(51) Int. Cl.
*G06T 7/521* (2017.01)
*H04N 13/254* (2018.01)
(Continued)

(52) U.S. Cl.
CPC .......... *G06T 7/521* (2017.01); *G06K 9/00201* (2013.01); *G06K 9/00838* (2013.01);
(Continued)

(58) Field of Classification Search
CPC .......... G06T 7/521; G06T 2207/30268; H04N 13/254; H04N 13/271; H04N 5/2226
See application file for complete search history.

(56) References Cited

U.S. PATENT DOCUMENTS

| 5,897,494 A | 4/1999 | Flock et al. |
| 8,866,910 B1 | 10/2014 | Cetin et al. |

(Continued)

FOREIGN PATENT DOCUMENTS

| CN | 105513410 | 4/2016 |
| CN | 106216815 | 12/2016 |

(Continued)

OTHER PUBLICATIONS

International Search Report and the Written Opinion dated Nov. 5, 2018 From the International Searching Authority Re. Application No. PCT/IL2018/050761. (9 Pages).

(Continued)

*Primary Examiner* — Michael E Teitelbaum
(74) *Attorney, Agent, or Firm* — Gentex Corporation; Bradley D. Johnson

(57) ABSTRACT

A system for acquiring information from an environment, comprising: a light source for generating at least one beam; a first optical setup for converting the at least one beam into a distorted light pattern projectable onto an environment; and a second optical setup for converting an original view returned from the environment and comprising the distorted light pattern deformed by at least one surface of the environment into a corrected image comprising a corrected pattern.

21 Claims, 6 Drawing Sheets

(51) Int. Cl.
*H04N 13/271* (2018.01)
*H04N 5/222* (2006.01)
*G06K 9/00* (2006.01)
*G06K 9/20* (2006.01)
*G06K 9/62* (2006.01)

(52) U.S. Cl.
CPC ......... *G06K 9/2018* (2013.01); *G06K 9/6256* (2013.01); *H04N 5/2226* (2013.01); *H04N 13/254* (2018.05); *H04N 13/271* (2018.05); *G06T 2207/30268* (2013.01)

(56) References Cited

U.S. PATENT DOCUMENTS

| | | | |
|---|---|---|---|
| 9,651,477 | B1 | 5/2017 | Libbey et al. |
| 2005/0237423 | A1 | 10/2005 | Nilson et al. |
| 2005/0276566 | A1 | 12/2005 | Iimura |
| 2006/0042851 | A1* | 3/2006 | Herrmann ......... B60R 21/01552 180/271 |
| 2007/0159607 | A1* | 7/2007 | Nishigaki ............. G03B 35/20 353/94 |
| 2010/0118123 | A1 | 5/2010 | Freedman et al. |
| 2011/0211044 | A1 | 9/2011 | Shpunt et al. |
| 2011/0310220 | A1* | 12/2011 | McEldowney ...... G02B 5/1895 348/42 |
| 2011/0310226 | A1 | 12/2011 | McEldowney |
| 2013/0038881 | A1 | 2/2013 | Pesach et al. |
| 2014/0049609 | A1* | 2/2014 | Wilson ................. H04N 13/271 348/46 |
| 2015/0097947 | A1 | 4/2015 | Hudman et al. |
| 2016/0046298 | A1 | 2/2016 | DeRuyck et al. |
| 2016/0253821 | A1 | 9/2016 | Romano et al. |
| 2016/0328882 | A1* | 11/2016 | Lee ...................... H04N 13/366 |
| 2017/0178272 | A1 | 6/2017 | Lashkari et al. |
| 2018/0060639 | A1 | 3/2018 | Lee et al. |

FOREIGN PATENT DOCUMENTS

| | | |
|---|---|---|
| WO | WO 2016/103271 | 6/2016 |
| WO | WO 2019/012534 | 1/2019 |
| WO | WO 2019/012535 | 1/2019 |

OTHER PUBLICATIONS

International Search Report and the Written Opinion dated Nov. 5, 2018 From the International Searching Authority Re. Application No. PCT/IL2018/050762. (14 Pages).
International Preliminary Report on Patentability dated Jan. 23, 2020 From the International Bureau of WIPO Re. Application No. PCT/IL2018/050761. (6 Pages).
International Preliminary Report on Patentability dated Jan. 23, 2020 From the International Bureau of WIPO Re. Application No. PCT/IL2018/050762. (8 Pages).
Notification of Office Action and Search Report dated Nov. 25, 2020 From the State Intellectual Property Office of the People's Republic of China Re. Application No. 201880045940.9 and a Machine Translation of the Office Action Into English. (25 Pages).
Official Action dated Jan. 28, 2021 From the U.S. Patent and Trademark Office Re. U.S. Appl. No. 16/615,827. (21 Pages).

* cited by examiner

SYSTEMS AND METHODS FOR ACQUIRING INFORMATION FROM AN ENVIRONMENT

RELATED APPLICATIONS

This application is a National Phase of PCT Patent Application No. PCT/IL2018/050762 having International filing date of Jul. 12, 2018, which claims the benefit of priority under 35 USC § 119(e) of U.S. Provisional Patent Application No. 62/531,417 filed on Jul. 12, 2017. The contents of the above applications are all incorporated by reference as if fully set forth herein in their entirety.

FIELD AND BACKGROUND OF THE INVENTION

The present invention relates to a system for acquiring information from an environment and methods of using same and, more particularly, to a system for projecting a wide angle distorted pattern onto a surface and acquiring a structured pattern therefrom.

Use of structured light for acquiring information relating to shape, depth and movement of objects in an environment is well known in the art.

Structured light systems project a known pattern (grids, dot matrices or horizontal bars) within a space of an environment (also termed herein as "scene") and calculate depth, shape and movement of objects in the scene from the deformation characteristics of the pattern when striking a surface of an object.

Structured light may be used for 3D scanning of objects (for engineering applications) and for identifying and tracking objects and subjects in an environment.

Structured light systems are typically based on triangulation between a projector and a camera. The projector generates a known pattern of light onto a three-dimensionally shaped surface. The pattern captured by the camera is distorted due to a triangulation effect between projector and camera which shifts the pattern. By calculating distortion (shift) for each location of the image, the geometry of the object may be reconstructed to create a depth image.

SUMMARY OF THE INVENTION

According to one aspect of the present invention there is provided system for acquiring information from an environment comprising: (a) a light source for generating at least one beam; (b) a first optical setup for converting the beam(s) into a distorted light pattern projectable onto an environment; and (c) a second optical setup for converting an original view returned from said environment and comprising a distorted light pattern deformed by at least one surface of said environment into a corrected image comprising a corrected pattern.

According to further features in preferred embodiments of the invention described below, the first optical setup converts the at least one beam into a structured light pattern and distorts the structured light pattern to generate the distorted light pattern.

According to still further features in the described preferred embodiments the corrected pattern is substantially identical to the structured pattern.

According to still further features in the described preferred embodiments the distorted light pattern has a larger angle of view than the projection angle of the structured light pattern.

According to still further features in the described preferred embodiments the angle of view of the distorted light pattern is between 50 and 220 degrees.

According to still further features in the described preferred embodiments the structured light pattern is radially distorted into the distorted light pattern.

According to still further features in the described preferred embodiments the first optical setup includes a first fisheye lens.

According to still further features in the described preferred embodiments the first optical setup includes a diffractive optical element (DOE).

According to still further features in the described preferred embodiments the second optical setup includes a second fisheye lens.

According to still further features in the described preferred embodiments the first fisheye lens and/or the second fisheye are afocal.

According to still further features in the described preferred embodiments optical characteristics of the second fisheye lens are substantially identical to that of the first fisheye lens.

According to still further features in the described preferred embodiments the DOE is positioned in an aperture plane of the first fisheye lens.

According to still further features in the described preferred embodiments the system further comprising an imaging sensor for capturing the corrected image generated by the second optical setup.

According to still further features in the described preferred embodiments the system further comprises a processing unit for deriving at least one of contour, depth and surface vibration information from the corrected light pattern.

According to still further features in the described preferred embodiments the imaging sensor is configured for in-focus mapping of a speckle field formed on the surface.

According to still further features in the described preferred embodiments the light source includes a collimating lens.

According to still further features in the described preferred embodiments the at least one beam has a wavelength longer than 800 nm.

According to still further features in the described preferred embodiments the system is configured for mounting inside a vehicle.

According to still further features in the described preferred embodiments the corrected image comprising the corrected light pattern deformed by the at least one surface is analyzed to acquire information on the environment.

According to still further features in the described preferred embodiments the system is capable of analyzing said corrected image to derive at least one of a vehicle occupant count, position and movement of occupants, posture of occupants, head and body parts position of occupants, activities of occupants, driver monitoring (including head position, hand position and actions), presence of infant seats and their occupancy status, presence of objects on the seats, an intruder in said vehicle, forgotten infants or pets in said vehicle.

According to still further features in the described preferred embodiments the at least one beam includes at least one of collimated beam and semi-collimated beam.

According to another aspect of the present invention there is provided a system for acquiring information from an environment comprising: (a) a light source for generating at least one collimated beam; (b) an optical setup including a first optical component for converting the at least one beam into a structured light pattern and a second optical component for distorting the structured light pattern into a distorted light pattern projectable onto an environment, wherein the distorted light pattern has a wider angle of view than the projection angle of the structured light pattern.

According to still further features in the described preferred embodiments the angle of view of the distorted light pattern is at least 4 times that of the projection angle of the structured light pattern.

According to still further features in the described preferred embodiments the first optical component includes a DOE and the second optical component includes an afocal fisheye lens.

According to still further features in the described preferred embodiments the distorted light pattern covers half of a sphere 1-2.5 meter in radius.

According to still further features in the described preferred embodiments the distortion is radial.

According to still further features in the described preferred embodiments the structured light pattern is projected at an angle of 20-50 degrees.

According to still further features in the described preferred embodiments the distorted light pattern is projected at an angle of 50-220 degrees.

According to another aspect of the present invention there is provided a system for acquiring information from an environment, comprising: (a) an optical setup for converting an original view returned from an environment and comprising a light pattern distorted by a preliminary optical setup and deformed by at least one surface of the environment into a corrected image comprising a corrected pattern; and (b) an imaging sensor for capturing the corrected image projected by the optical setup.

According to still further features in the described preferred embodiments the first optical component includes an afocal fisheye lens.

According to another aspect of the present invention there is provided a method for acquiring information from an environment, comprising: (a) generating at least one beam by a light source; (b) converting the at least one beam into a distorted light pattern projectable onto an environment; and (c) converting an original view returned from the environment and comprising the distorted light pattern deformed by at least one surface of the environment into a corrected image comprising a corrected pattern.

According to still further features in the described preferred embodiments the method further comprises (d) capturing the corrected image by an imaging sensor.

The present invention successfully addresses the shortcomings of the presently known configurations by providing a system capable of acquiring information from a confined environment using a single projected pattern.

Unless otherwise defined, all technical and scientific terms used herein have the same meaning as commonly understood by one of ordinary skill in the art to which this invention belongs. Although methods and materials similar or equivalent to those described herein may be used in the practice or testing of the present invention, suitable methods and materials are described below. In case of conflict, the patent specification, including definitions, will control. In addition, the materials, methods, and examples are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE SEVERAL VIEWS OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF SPECIFIC EMBODIMENTS OF THE INVENTION

Figure 1:
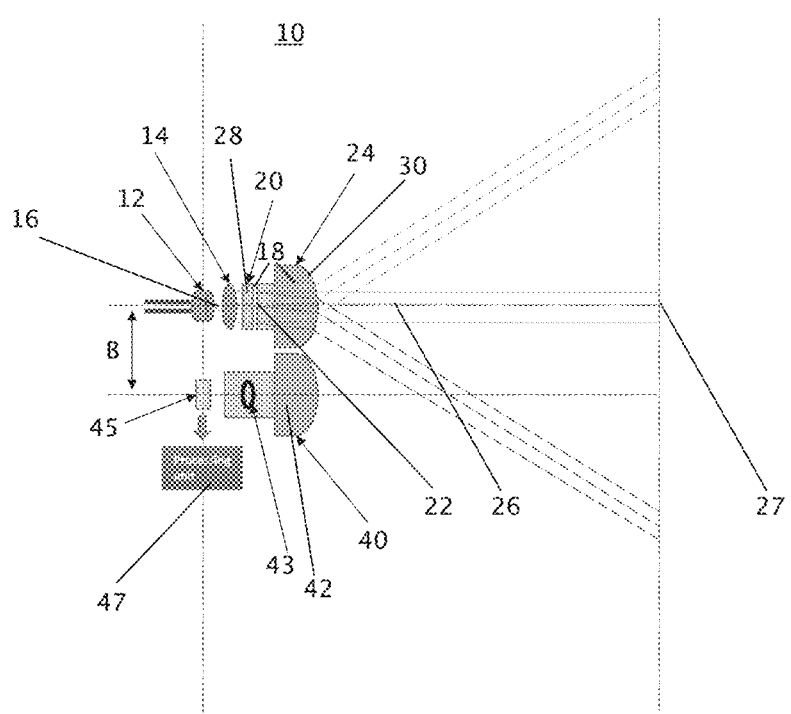
FIG. 1 schematically illustrates one embodiment of a system for acquiring information from an environment, according to some embodiments of the present invention.

The present invention, in some embodiments thereof, relates to systems and methods of acquiring information from a confined environment and, more particularly, but not exclusively, to acquiring information by using a distorted light pattern projected onto an environment.

The principles and operation of the present invention may be better understood with reference to the drawings and accompanying descriptions.

Before explaining at least one embodiment of the invention in detail, it is to be understood that the invention is not limited in its application to the details set forth in the following description or exemplified by the Examples. The invention is capable of other embodiments or of being practiced or carried out in various ways. Also, it is to be understood that the phraseology and terminology employed herein is for the purpose of description and should not be regarded as limiting.

The amount of information captured by a structured light system is limited by the projection depth and distance as well as the size of objects queried. Therefore, structured light systems cannot effectively cover scenes of confined environments such as a vehicle cabin using a single pattern since the angle of view of patterns projected by such systems is limited and requires a wide field photography which distorts the image. While typical structured light systems may be useful for querying small objects at relatively small distances or large objects at large distances, capturing information from large objects such as humans at relatively small distances (less than a meter) may be challenging. Such limitations of structured light systems may be overcome using multiple overlapping patterns or by scanning a scene using a single pattern however, these approaches are processor intensive and costly to implement. Deriving information from multiple overlapping patterns is a processor-intensive task due to 'cross-talk' between patterns and the need to process information from several distorted overlapping patterns (as seen in wide field photography).

It has been discovered that in order to completely cover a vehicle cabin a single pattern must cover an area of about 3 by 1.5 meters. However, since a typical distance between a projector and cabin objects (including passengers) is 30-250 cm, the angle of view required for such coverage (160 degrees) cannot be achieved without distorting the structured pattern.

While a distorted projected pattern may be used to acquire information from a scene, use of such a pattern may lead to loss of information or acquisition of erroneous information (e.g. incorrect object shape, inability to distinguish object from background).

To solve the problem of acquiring information from a confined environment (such as a vehicle cabin) using a single pattern, a system is suggested which projects a distorted light pattern onto the environment, then uses a wide angle optical setup to reverse this distortion in an image of the environment, so a corrected image with corrected (non-distorted) pattern may be analyzed to acquiring information.

Thus, according to an aspect of the present invention, there is provided a system for acquiring information from an environment.

As used herein, the term environment refers to any open or closed space having surfaces onto which a pattern may be projected. The surfaces onto which the pattern is projected and from which information is acquired may also be referred to herein as a "scene". One example of an environment is a cabin of a vehicle such as a car, bus, train, airplane and the like.

As used herein, the phrase "light pattern" refers to any known pattern formed by a plurality of light beams. A pattern may be non-structured or it may be structured. Grids, striped patterns, dot matrices, lines, quasi-random patterns and the like are structured patterns. When distorted, such patterns lose their structure and are referred to herein as non-structured patterns. A pattern may be any general shape, rectangular circular and the like.

As used herein, the term "distortion" refers to an effect of an optical setup or device on a light pattern projected therethrough, wherein the pattern is deviated from rectilinear projection. In a rectilinear projection, straight lines of the original pattern remain straight in the projected pattern, wherein in a distorted pattern, the lines are changed. Distortion may change an overall shape of the light pattern as well as shape and spacing of pattern elements (e.g. striped, dots etc) of the light pattern. In a radial distortion, changes are radially symmetric, or approximately so, arising from the symmetry of a lens. For example, a fisheye lens radially distorts a square pattern of dots and increase spacing between pattern elements (the dots).

As used herein, the term "deformation" refers to an effect of a surface on the shape of a light pattern projected onto the surface. When a light pattern is projected on the surface, the light pattern returning from the surface has a different shape than the original light pattern, according to the shape and/or angle of the surface. The change may be of the overall shape of the light pattern as well as shape and spacing of pattern elements.

In order to provide a wide angle of view suitable for confined environments and traverse the aforementioned limitations of distorted patterns, a system having the following components is suggested:

(i) one or more light (visible or invisible) source(s), each capable of generating a single, optionally collimated or semi-collimated beam;

(ii) a first optical setup for converting the light beam(s) into a structured pattern and for distorting the structured pattern into a distorted pattern having a wider angle of view than the angle in which the structured pattern is projected;

(iii) a second optical setup for converting an original view returned from the environment and comprising the distorted light pattern after it was deformed by at least one surface of the environment into a corrected image comprising a corrected pattern (The corrected pattern may be identical or similar (e.g. same shape but a different size or different spacing of pattern elements) to the structured pattern); and (iv) imaging sensor for capturing the corrected image. This image includes a deformed pattern, according to the shapes and angles of the surface(s) in the environment. The deformed pattern may then be analyzed to acquire information on the environment and the surfaces.

These components may be packaged in a single housing to provide a system mountable in a confined environment such as a vehicle cabin. Each of the first and second optical setups may include one or more optical components and/or devices.

The pattern mapped to the imaging sensor may be communicated to a processing unit co-housed with the above components or provided remotely (e.g. in a vehicle management system or cloud). The processing unit may process information relating to pattern distortion/shift (due to depth) in order to provide depth, contour and movement information relating to objects (e.g. vehicle occupants) positioned in the environment (e.g. vehicle cabin).

A light source that may be used with the present invention may be, for example, a diode laser having a wavelength of 800-1000 nm. The beam projected by the light source may be collimated or semi-collimated, for example by an aspheric lens 0.5-10 millimeters (mm) in diameter. The beam may be, for example, 2-5 mm in width and may be focused to a distance of, for example, 1-2.5 m. The beam may be split by a diffractive optical element (DOE) into dots pattern of, for example, 0.7 mW (class1 laser at 830 nm) each. The total power (typically about 0.1-10 Watts) is calculated by the sum of power for each spot (class1 laser power limit). Multiple light sources may be used, to generate multiple light beams. Each of these light beams may be converted into a part of the structured pattern. For example, 4 light sources may generate 4 light beams, each converted to a quarter of a structured pattern, for example projected onto each of 4 seats in a vehicle.

The DOE is configured for generating a dot matrix of, for example, 10-1000 dots in each dimension. The adjacent angle between dots may be 0.01-10 degrees in X and/or Y axis. The total field angle may be 10-80 degrees (in each axis) and the size of the DOE may be 1-10 mm×1-10 mm.

The DOE generated pattern may be distorted, for example, by an afocal fisheye lens having a field of view (FOV) of 160-220 degrees and F-theta distortion of between −30% and +15%. Both focal and afocal lenses collect light from object plane. Over the image plane however, there is a difference between them. The focal lens is focusing the light over the image plane, while the afocal lens is not focusing, so another lens should be place behind it in order to focus the light. Other optical elements may generate the distortion, for example wide angle lens which may be characterized by radial distortion.

The second optical setup may include, for example, a similar fisheye lens capable of generating an image, of size 2-5 mm, for example. The second optical setup does not have to include wide field of view components, and may include any other optical component that corrects the distortion of the pattern made by the first optical setup.

The imaging sensor may be, for example, a complementary metal-oxide-semiconductor (CMOS)/charge-coupled device (CCD) sensor with a pixel size of 1-10 micrometer (μm) and an high definition (HD)/full high definition (FHD)/Video Graphics Array (VGA) resolution.

The processing unit may include any processor executing an algorithm suitable for analyzing the corrected image captured by the imaging sensor, which include a corrected pattern which is deformed by the surface(s) in the environment, and extract information about the environment. For example, the analysis may include identifying the captured image spots, measuring the shift (depth) of each spot from a reference (projected) location, reconstructing the depth by calculation or comparing shift length to a look-up table, or by triangulation formula, and comparing spot depth with adjacent spots to increase depth certainty.

In addition to acquiring depth, contour and movement information, the present system is also capable of qualifying and quantifying surface vibrations (e.g. microvibrations). Surface vibrations of a remote object may be measured using Laser Doppler Vibrometers (LDV) or by analyzing speckle pattern patterns generated on a surface. Speckles are characterized by an intensity pattern produced by interference from a wave front that is scattered from a rough surface. Speckles imaging provides detailed images of the speckles that allows tracking their variation over time to extract surface motion such as rotation, translation and deformation.

Application WO2016103271 discloses a speckle analysis system which utilizes eye-safe, low power light radiation (e.g. class I laser) and unique speckle analysis algorithms to detect vibrations from a surface of an object or subject in any environment and in real time. The present system may incorporate a speckle analysis approach such as that described in WO2016103271 to analyze speckles formed by the surface on the projected pattern and derive surface vibration information indicative of presence and movement of a human or pet, for example, a child or pet left in a car.

Figure 2A:
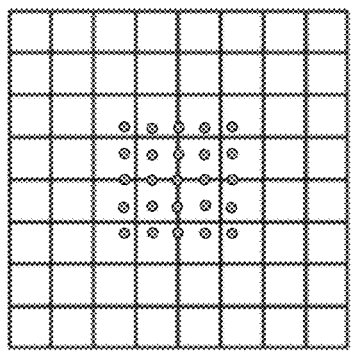
FIGS. 2A-C illustrate surface projection of a non-distorted pattern (FIG. 2A), a distorted pattern generated from the non-distorted pattern of FIG. 2A and projected on a surface (FIG. 2B) and a corrected pattern captured by the present system from surface projection of the distorted pattern of FIG. 2B (FIG. 2C), according to some embodiments of the present invention.
Figure 2B:
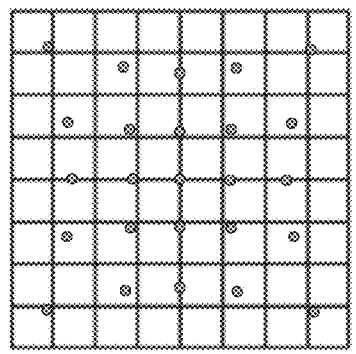
Figure 2C:
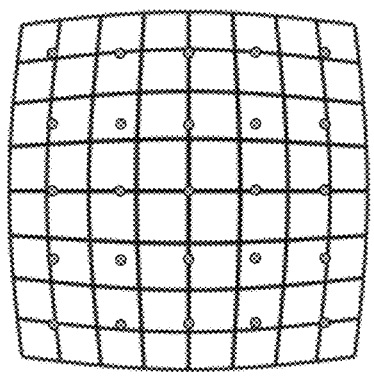
Figure 3A:
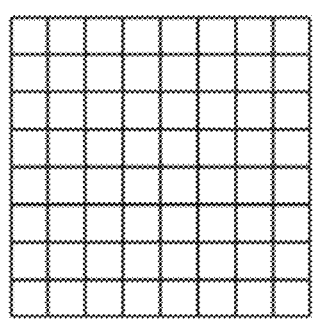
FIGS. 3A-C schematically illustrate various deformation of grid patterns on flat (FIG. 3A), convex (creating a "pincushion" pattern) (FIG. 3B) and concave (creating a "barrel" pattern) (FIG. 3C) object surfaces.
Figure 3B:
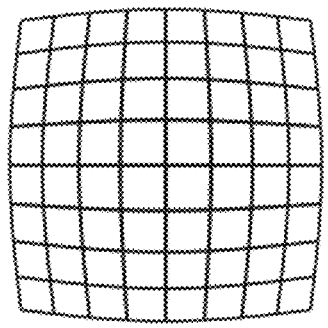
Figure 3C:
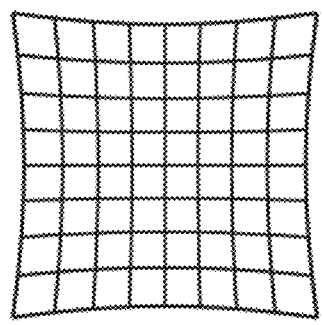

Referring now to the drawings, FIG. 1 illustrates one embodiment of the present system which is referred to herein as system 10, according to some embodiments of the present invention. FIG. 2A illustrates surface projection of a non-distorted pattern, FIG. 2B illustrates a distorted pattern generated from the non-distorted pattern of FIG. 2A and projected on a surface, and FIG. 2C illustrates a corrected pattern captured by the present system from surface projection of the distorted pattern of FIG. 2B, according to some embodiments of the present invention. FIGS. 3A, 3B and 3C illustrate the deformation effect of exemplary flat, convex (creating a "pincushion" pattern) and concave (creating a "barrel" pattern) surfaces, respectively, on pattern shape as well as on pattern element spacing and shape, according to some embodiments of the present invention.

As shown in FIG. 1, System 10 includes a light source 12 having a collimating lens 14 for generating a collimated beam 16. Light source 12 may include a Laser diode generating a beam with a wavelength of 830 nanometer (nm) (near-infrared-NIR) and a total power of about 3 Watt.

The beam may be collimated, for example, by a 3 mm focal length, 2 mm diameter, aspheric lens to create a 2 mm wide collimated beam.

System 10 also includes an optical device 18 including a first optical component 20 for converting collimated beam 16 into a structured light pattern 22 and a second optical component 24 for distorting structured light pattern 22 into a distorted light pattern 26 projectable onto a surface 27 (object plane).

First optical component 20 is preferably a diffractive optical element (DOE) 28 a single element capable of phase/attenuation modulation or creating a diffractive pattern or is a micro lens array.

DOE 28 may generate a dot matrix pattern of, for example, 61×61 dots (also referred to herein as spots. Alternatively, other patterns may be generated, for example random dots and/or lines.

The adjacent angle between dots is 0.57 degrees (x and y axis) with a total field angle of 34×34 degrees. The pattern may be rectangular with an area of 3×3 mm (larger than collimated beam 16).

When projected onto a surface, structured light pattern 22 forms a square-shaped dot matrix including 61×61 dots, spaced 10 mm at distance of 1 meter apart (see FIG. 2A).

DOE 28 is positioned along the path of collimated beam 16 1-2 mm away from the beam source. The position and orientation of DOE 12 may be preset and fixed or it may be varied by mounting DOE 12 on a movable platform (which may be motorized).

Second optical component 24 is optionally an afocal fisheye lens 30 having an FOV of 200 degrees. The angle of view of distorted light pattern 26 and the field of view (FOV) are greater than that of structured light pattern 22. The angle of view of distorted light pattern 24 (in the X and/or Y axis) may be, for example 50-220 degrees, 20-50 degrees or 160-200 degrees.

Fisheye lens 30 is positioned along the path of beams forming structured light pattern 22, such that DOE 28 is positioned in an aperture plane of afocal fisheye lens 30. The position and orientation of afocal fisheye lens 30 may be preset and fixed or it may be varied by mounting fisheye lens 30 on a movable platform (which may be motorized).

Distorted light pattern 26 may be radially distorted by fisheye lens 30 to form a dot matrix such as that shown in FIG. 2B. Alternative shapes may also be used.

In order to acquire information from an environment, system 10 projects distorted light pattern 26 onto surfaces in an environment (scene) and captured the returned light via a second optical device 40.

Second optical device 40 includes a fisheye lens 42 for capturing light reflected from the surfaces (representing distorted light pattern 26) and converting distorted light pattern 26 into a corrected pattern which may be similar or identical in shape to structured light pattern 22, for example different in magnification while having identical radial distortion. Fisheye lens 42 may have a FOV of 200 degrees, an image circle 3.5 mm diameter and an equivalent focal length (EFL) of 1.05 mm.

The optical components of system 10 may be setup as follows. First and second lenses (30 and 42 respectively) are positioned side by side at the same height (optical axis) with a distance therebetween (referred to as backbone, B in FIG. 1) set for example at 50 mm or any other distance. The backbone forms the triangulation baseline and affects the overall depth accuracy of the system.

Although a distorted pattern may be processed to derive surface information, converting distorted light pattern 26 into a corrected pattern similar or identical in shape to structured light pattern 22 as effected by system 10 of the present invention greatly facilitates identification of dots (each dot should be placed at specific region-grid). this is especially true when sunlight and other bright objects are present (noisy picture), easy identification of spots greatly reduced process. In addition, since the spatial resolution of the depth map is fixed, there is no need for interpolation in order to register dots to the 2D image.

The corrected image comprising the corrected pattern generated by system 10 is projected, for example, onto an imaging device 45 (CCD/CMOS) having a pixel size of 3.75 μm, a resolution of 1280×960 and an active region 4.8×3.6 mm in area.

Figure 4:
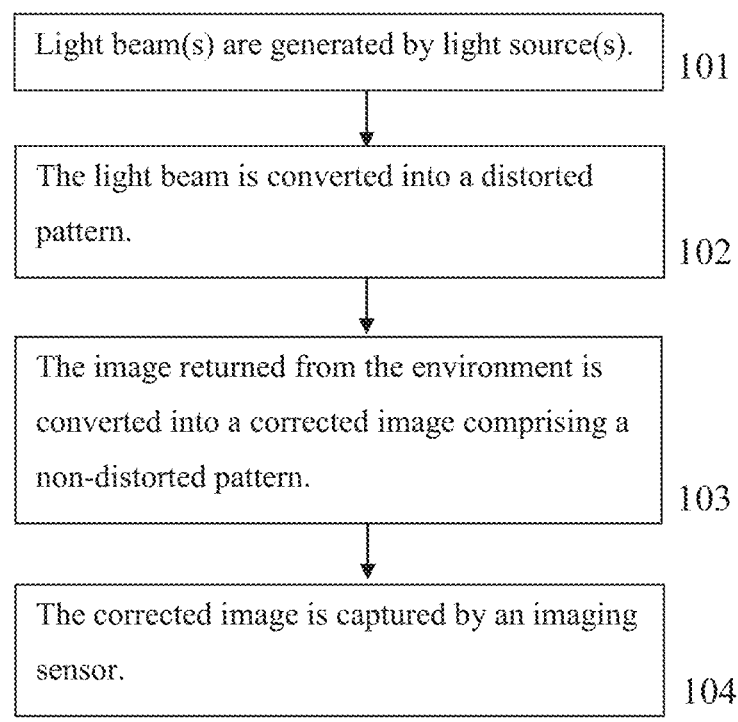
FIG. 4 is a flowchart schematically representing a method for acquiring information from an environment, according to some embodiments of the present invention.

Reference is now made to FIG. 4, which is a flowchart schematically representing a method for acquiring information from an environment, according to some embodiments of the present invention.

First, as shown at 101, one or more light beams are generated by at least one light source, optionally collimated or semi-collimated, as described above. For example, a collimated beam generated by 4 diode lasers and collimated by an aspheric lens Then, as shown at 102, the light beam is converted into a structured pattern and the structured pattern is distorted into a distorted pattern having a wider angle of view than the projection angle of the structured pattern, as described above. For example, the collimated beam is diffracted by an optical element followed by distortion through an afocal fish-eye lens, to create a distorted dot matrix.

Then, as shown at 103, an original view returned from the environment and comprising the distorted light pattern after it was deformed by at least one surface of the environment is converted into a corrected image comprising a corrected pattern, as described above. For example, the distorted dot matrix pattern which is projected onto a surface is returned from the surface. An image of the dot matrix and surface then goes through a fish-eye lens having similar characteristics as the afocal lens used for projection.

Then, as shown at 104, the corrected image is captured by an imaging sensor, as described above. For example, the image is captured by a CMOS sensor.

Figure 5:
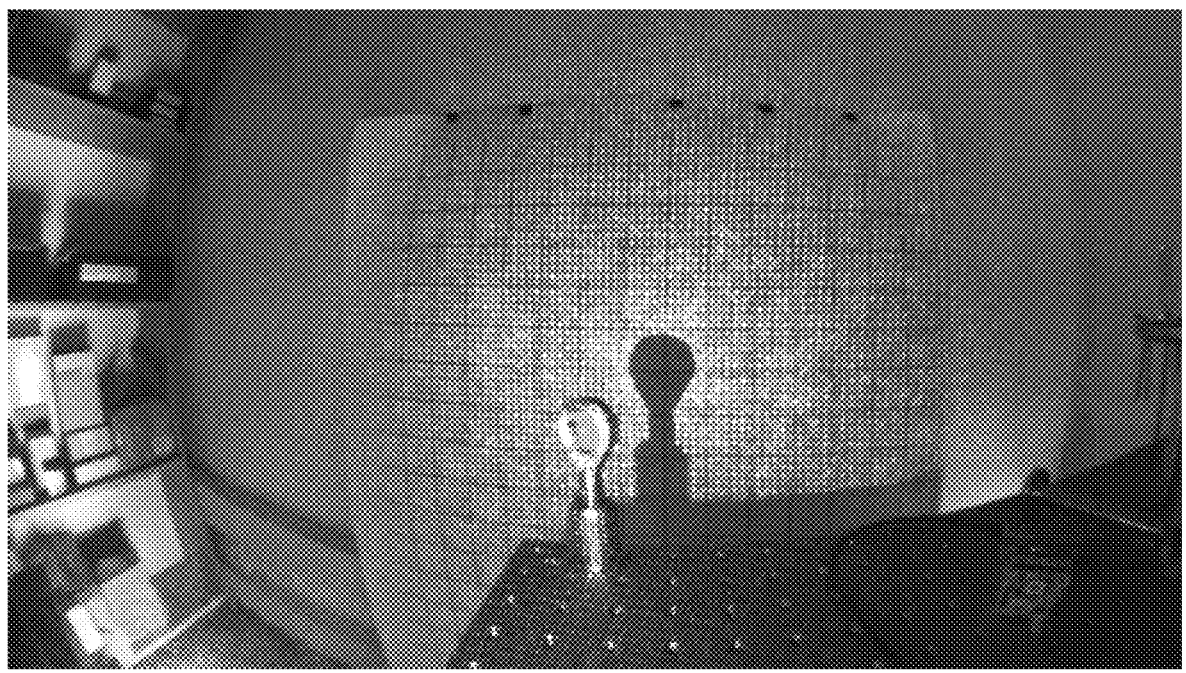
FIG. 5 is an image of a distorted dot matrix pattern (white dots) projected over real grid lines (black lines), according to some embodiments of the present invention.

Reference is now made to FIG. 5, which is an image of a distorted dot matrix pattern projected over real grid lines, according to some embodiments of the present invention.

The distorted dot matrix pattern (white dots) is projected onto a surface having a real (physical) grid (black lines). The dot matrix pattern is captured as a corrected pattern (similar in shape and size to the dot matrix generated by diffraction) while the grid is distorted by the fisheye lens used for image capture.

Figure 6A:
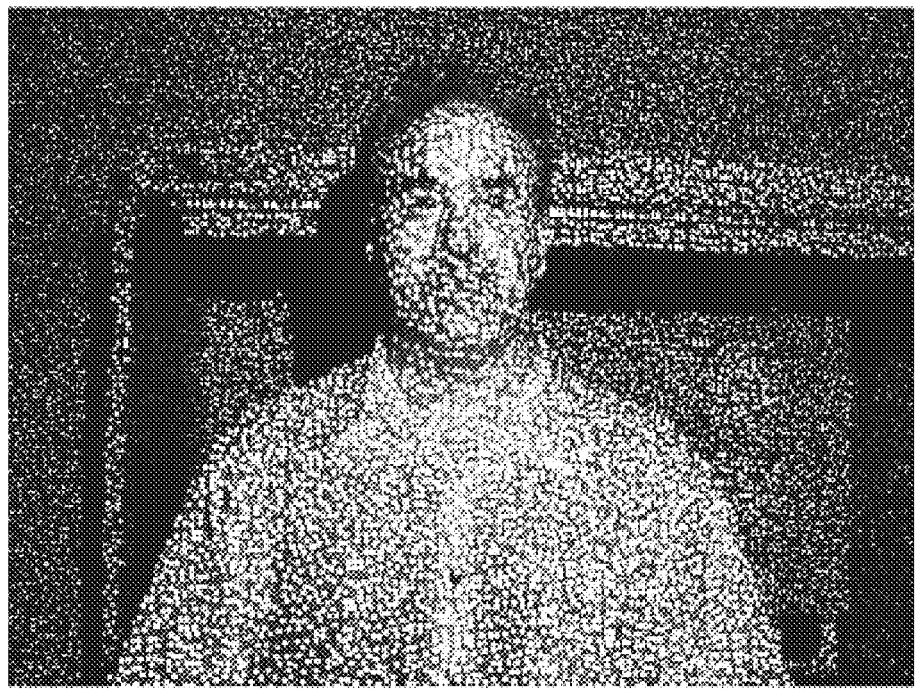
FIGS. 6A and 6B show other patterns that may be used except doted matrix, random dots and lines, respectively, according to some embodiments of the present invention.
Figure 6B:
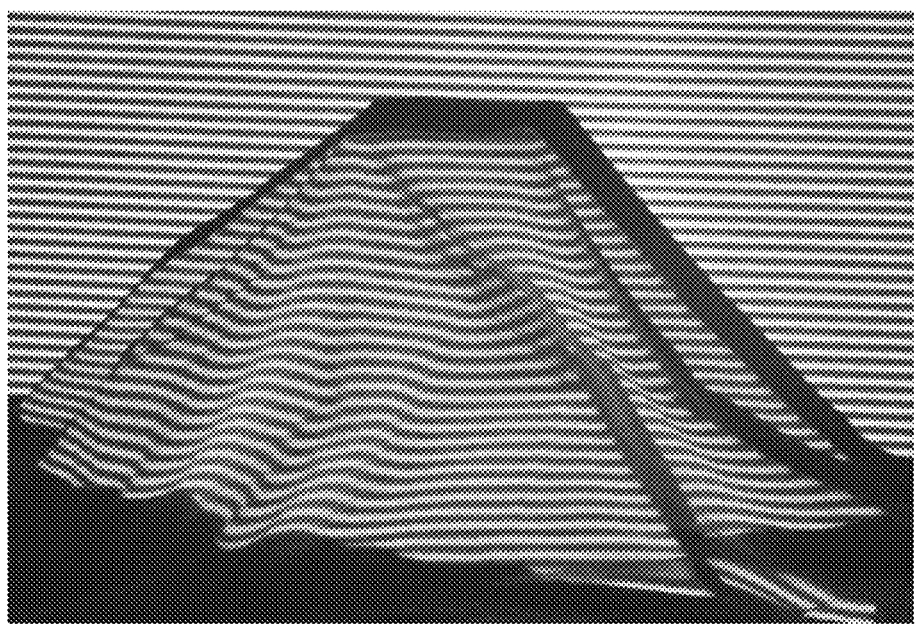

Reference is now made to FIGS. 6A and 6B, which show other patterns that may be used except doted matrix, random dots and lines, respectively, according to some embodiments of the present invention.

Information relating to position and intensity is collected over time with respect to each dot of the dot matrix acquired from the surface and processed via processing unit 47. The output of this process is a point cloud which is further processed by the processing unit in order to provide information for various in-car applications. The system utilizes the information from the point cloud and additional information layers (described below) to provide indications for vehicle safety and comfort systems. Such indications are pre-defined by car manufacturer and are typically transmitted by the controller area network (CAN-bus) protocol. The active safety systems use the indications in order to continuously optimize their performance in real-time.

A point cloud of the car interior provides rich information that supports various safety and comfort applications. It may be used in itself for object and motion detection or in may be used in combination with additional data layers such as image and micro-motion detection, to enhance to performance of the system. One such application is occupancy detection with each seat of a vehicle monitored for passenger and object detection. Once the point cloud provides an indication that a seat is not empty, the system further analyzes the point cloud in order to differentiate between an object and a passenger. If a passenger is identified, an indication is sent to the vehicle safety system to apply a seat belt reminder if a seat belt is not buckled. If an object is found on a seat, the system estimates its shape and size and logs the object in accordance with the car manufacturer requirements. For example, if an infant seat is recognized on the front passenger seat, an indication is sent to the vehicle safety system and the airbag is turned off automatically for that seat.

Once a seat is classified as occupied the point cloud is analyzed in order to estimate the height and weight of the passenger. Comparing the outputs with statistical tables the system classifies the passenger weight into an appropriate percentile group. This indication allows the airbag deployment system to activate the airbags with appropriate power or deactivate airbags in order to minimize the danger to the passenger from airbag deployment. The passenger's height and weight are analyzed and a height/weight segmentation provides additional useful information for airbag deployment control and may further reduce the potential damage from airbag deployment.

The posture of a passenger is continuously detected by cloud point analysis and classified into a pre-defined list of seating positions. The seating position indication may be used in different ways to improve passenger safety. First, a warning may be sent to the driver and passenger if a dangerous sitting position is detected. Second, if a passenger is found in a dangerous position for airbag deployment, the indication may be used to deactivate the airbag or (in smart airbags) partially deactivate according to the pose.

The position of the front seats is an additional parameter for airbag deployment and seatbelt control.

When a car is parked the occupancy status of the cabin is monitored to check the presence of passengers, infants and pets. The safety system reacts in accordance to the indications of occupancy. For example, if an infant or a pet was found alone in a parked car, the car horn may be activated to alert by-passers, the air conditioner may be turned on to reduce the danger of heat stroke and a message may be sent to the car owner via a wireless network (e.g. cellular). In addition an alarm message may be sent to emergency centers, including the position of the vehicle as derived from the navigation system.

An autonomous car must take into account the occupancy status at the end of a drive. If a driver or passenger is sleeping when reaching a destination, or if parked in a closed parking space, a number of actions may be taken in order to wake the driver/passenger or send a message via a wireless network to warn the emergency authorities about potential danger.

The present system may also be used for driver monitoring. Information about driver status may be extracted from the cloud point to find, for example, if the driver is holding the steering wheel. The position and direction of the driver's head and hands may also be monitored to see if a driver is distracted by, for example, a smartphone. The position of the driver may be monitored when starting the engine and to make sure that a car is completely stopped before the driver or passengers exit. Driver height may also be used to stop a child from starting a vehicle.

The present system may also be used to provide information to comfort applications such as adaptive audio optimization applications that are based on the occupancy status of the cabin. The position of the passenger heads may be used in order to optimize the audio performance and to allow for active noise cancellation for the driver and passengers. Driver and passenger recognition may be used to discriminate between individuals and automatically load their preferred audio settings as well as seat and mirror positions and other controllable systems within the cabin.

The in-car information collected by the present system may also be used for statistical analysis. First, the indications provided by the system may be sent wirelessly to a server together with images of the cabin and other indications from sensors within the cabin. This may be used by machine-learning techniques to test and improve the performance of the system. In addition, if the images are either manually or automatically classified, machine-learning algorithms may be trained to recognize different scenarios. The updated parameter set may be uploaded wirelessly onto the deployed sensors together with software updates to either improve the existing functionality of the system or to provide new functionality.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for acquiring information from an environment, comprising:
   (a) a light source for generating at least one beam forming a structured light pattern;
   (b) a first optical setup having at least one lens for distorting said structured light pattern into a distorted light pattern projectable onto an environment, said at least one lens is selected to have an angle of view required for covering, by said distorted light pattern, an interior of a vehicle cabin, when projected inside said vehicle cabin and to generate a pre-determined shape of distorted light pattern; and
   (c) a second optical setup for converting an original view returned from said environment and comprising said distorted light pattern deformed by at least one surface of said environment into a corrected image in which said shape of distorted light pattern is corrected to a corrected pattern.

2. The system of claim 1, wherein said first optical setup converts said at least one beam into said structured light pattern and distorts said structured light pattern to generate said distorted light pattern.

3. The system of claim 2, wherein said corrected pattern is substantially identical to said structured light pattern.

4. The system of claim 2, wherein said distorted light pattern has a larger angle of view than a projection angle of said structured light pattern.

5. The system of claim 2, wherein said angle of view of said distorted light pattern is between 50 and 220 degrees.

6. The system of claim 2, wherein said structured light pattern is radially distorted into said distorted light pattern.

7. The system of claim 1, wherein said at least one lens includes a first fisheye lens.

8. The system of claim 7, wherein said second optical setup includes a second fisheye lens; wherein said first fisheye lens and/or said second fisheye are afocal.

9. The system of claim 7, wherein said second optical setup includes a second fisheye lens, wherein optical characteristics of said second fisheye lens are substantially identical to that of said first fisheye lens.

10. The system of claim 7, wherein said first optical setup includes a diffractive optical element (DOE); wherein said DOE is positioned in an aperture plane of said first fisheye lens.

11. The system of claim 1, further comprising an imaging sensor for capturing said corrected image generated by said second optical setup.

12. The system of claim 11, wherein said imaging sensor is configured for in-focus mapping of a speckle field formed on said surface.

13. The system of claim 1, further comprising a processing unit for deriving at least one of contour, depth and surface vibration information from said corrected light pattern.

14. The system of claim 1, wherein said at least one beam has a wavelength longer than 800 nm.

15. The system of claim 1, configured for mounting inside a vehicle; further comprising a processor capable of analyzing said corrected image to derive at least one of a vehicle occupant count, position and movement of occupants, posture of occupants, head and body parts position, activities of occupants, driver monitoring, presence of infant seats and their occupancy status and presence of objects on the seats, an intruder in said vehicle, forgotten infants or pets in said vehicle.

16. A system for acquiring information from an environment, comprising:
   (a) a light source for generating a at least one beam; and
   (b) an optical setup including a first optical component for converting said at least one beam into a structured light pattern and a second optical component having at least one lens for distorting said structured light pattern into a distorted light pattern projectable onto an environment, said at least one lens of said second optical component is selected to have an angle of view required for covering, by said distorted light pattern, an interior of a vehicle cabin, when projected inside said vehicle cabin and to generate a pre-determined shape of distorted light pattern,
   wherein said distorted light pattern has a wider a projection angle of than said structured light pattern.

17. The system of claim 16, wherein said angle of view of said distorted light pattern is at least 4 times that of a projection angle of said structured light pattern.

18. The system of claim 16, wherein said distorted light pattern covers half of a sphere 1-2.5 meter in radius.

19. The system of claim 16, wherein said distortion is radial.

20. The system of claim 16, wherein said first optical component includes a diffractive optical element (DOE) and said second optical component includes an afocal fisheye lens; wherein said distorted light pattern is projected at an angle of 50-220 degrees.

21. A method for acquiring information from an environment, comprising:
   (a) generating at least one beam by a light source;
   (b) converting said at least one beam into a distorted light pattern projectable onto an environment, said distortion is generated according to a pre-determined shape of distorted light pattern; and
   (c) converting an original view returned from said environment and comprising said distorted light pattern deformed by at least one surface of said environment into a corrected image in which said pre-determined shape of distorted light pattern is corrected to a corrected pattern;
   wherein said distorted light pattern is generated to have an angle of view required for covering an interior of a vehicle cabin, when projected inside said vehicle cabin.

* * * * *